United States Patent [19]
Roesner

[11] 3,990,304
[45] Nov. 9, 1976

[54] FLUID INTERFACE MEASURING DEVICE FOR USE IN EARTH BOREHOLES
[75] Inventor: Raymond E. Roesner, Houston, Tex.
[73] Assignee: Dresser Industries, Inc., Dallas, Tex.
[22] Filed: Sept. 18, 1975
[21] Appl. No.: 614,579

[52] U.S. Cl. .................................................. 73/151
[51] Int. Cl.² ........................................ E21B 47/06
[58] Field of Search .................. 73/151, 152, 389 R, 73/407 R, 438

[56] References Cited
UNITED STATES PATENTS

| | | | |
|---|---|---|---|
| 3,184,965 | 5/1965 | Noik ................................. | 73/438 X |
| 3,455,156 | 7/1969 | Lahaye et al. ........................ | 73/151 |
| 3,616,688 | 11/1971 | Roussin et al. ........................ | 73/151 |

*Primary Examiner*—Jerry W. Myracle
*Attorney, Agent, or Firm*—William E. Johnson, Jr.

[57] ABSTRACT

The borehole instrument contains a pair of bellows which are equally spaced from a differential pressure transducer to provide equal temperature expansion of the liquid to provide a true reading on the transducer. A third bellows is connected between the borehole fluid and the exterior of the transducer housing to eliminate pressure buildup in or around the transducer. The instrument has utility in finding oil-water, gas-oil and gas-water interfaces and other combinations of fluid interfaces by measuring the differential pressure across the interface.

5 Claims, 3 Drawing Figures

FLUID INTERFACE MEASURING DEVICE FOR USE IN EARTH BOREHOLES

BACKGROUND OF THE INVENTION

This invention relates generally to an apparatus for measuring the interface between two fluids, and in particular to an apparatus for measuring the pressure differential between two elevations in an earth borehole to provide an indication of the fluid interface.

The desirability of locating fluid interfaces in an earth borehole has been long recognized in the art of well logging. However, the prior art systems have generally been plagued by the drift effects of temperature and pressure or, in attempting to overcome such problems, have been very complex and expensive.

It is therefore the primary object of the present invention to provide an improved apparatus for measuring the interface between fluids in an earth borehole.

It is a further object of the invention to provide an improved apparatus for measuring the fluid interface within the earth borehole which is substantially unaffected by the effects of temperature and pressure.

The objects of the invention are accomplished, generally, by providing an earth borehole instrument having a pair of bellows equally spaced from a differential pressure transducer and by the provision of means to expose the exterior of the differential pressure transducer to the pressure of the borehole fluid of interest.

These and other objects, features and advantages of the present invention will be apparent from the following detailed description wherein reference is made to the figures of the accompanying drawings and like numerals indicate like portions of the apparatus:

Figures 1, 2:
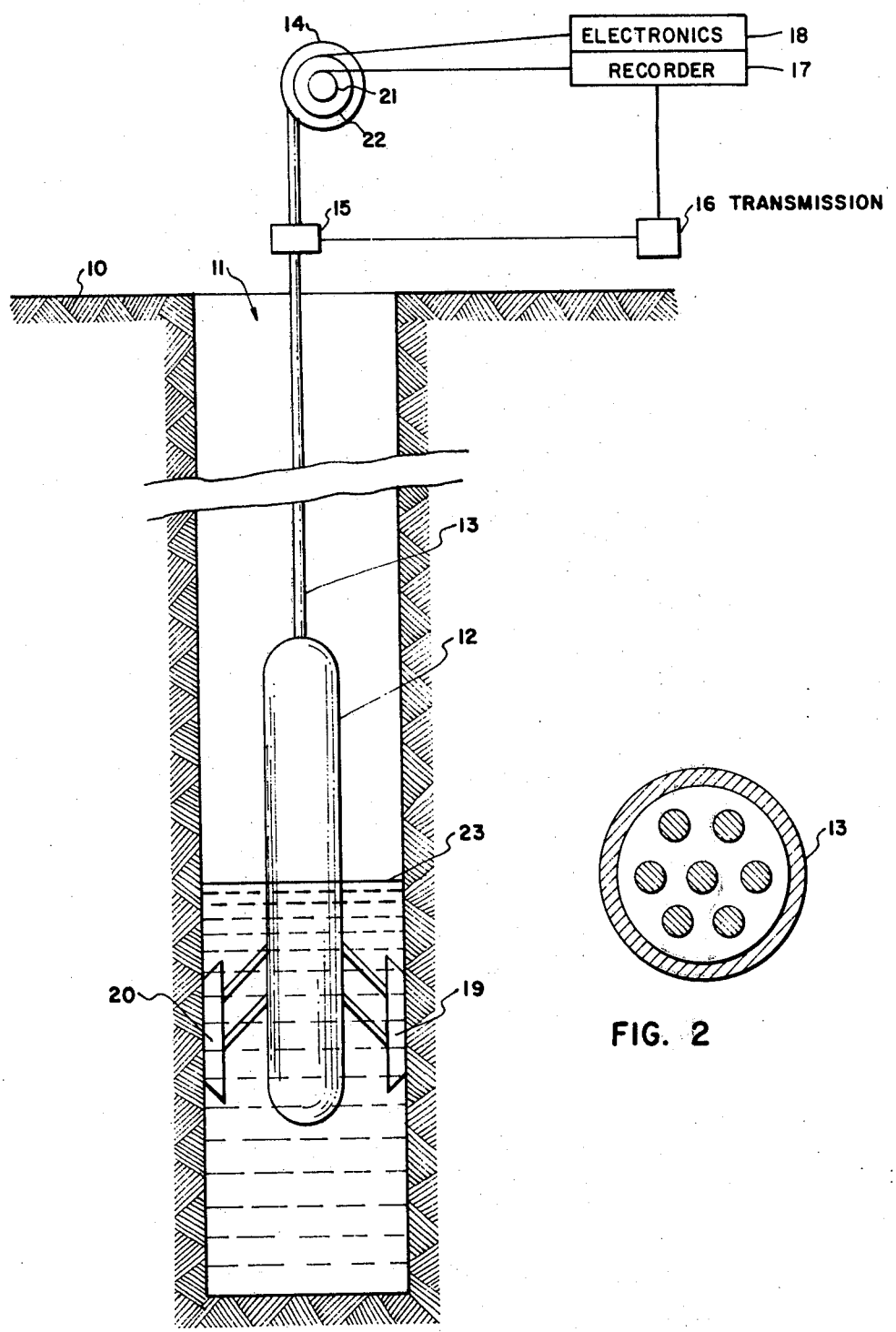
FIG. 1 is an elevated view, partly in cross section, of the borehole instrument in accordance with the present invention within an earth borehole.
FIG. 2 is a cross-sectional view through a portion of the logging cable in accordance with FIG. 1 utilized in causing the borehole instrument to traverse the earth borehole.

Referring now to the drawing in more detail, especially to FIG. 1, there is illustrated a portion of the earth's surface 10 traversed by an earth borehole 11. A well logging instrument 12 is suspended in the borehole 11 by a logging cable 13, the cable 13 being wound on a drum 14 at the earth's surface. The cable 13 also passes over a measuring sheave 15 to drive a transmission 16 which in turn drives recorder 17, for example, an X-Y plotter, so that the information recorded thereon from the surface electronics section 18 is related to depth in the borehole. The borehole instrument 12 is illustrated in greater detail in FIG. 3. The instrument 12 also has a plurality of decentralizers, two of which are illustrated and identified generally by the numerals 19 and 20. As is well known in the art, the decentralizers keep the instrument 12 from being up against the borehole wall. Although the borehole 11 is shown as being uncased, it should be appreciated by those skilled in the art that the borehole 11 can be cased when the instrument according to the present invention is being used to log the interface between fluids in a cased borehole.

As is conventional in the art, the signals from the instrument 12 are transmitted up the cable 13, shown in cross section in FIG. 2, and are taken off of slip rings 21 and 22 on the drum 14 and coupled into the surface electronics section 18.

Figure 3:
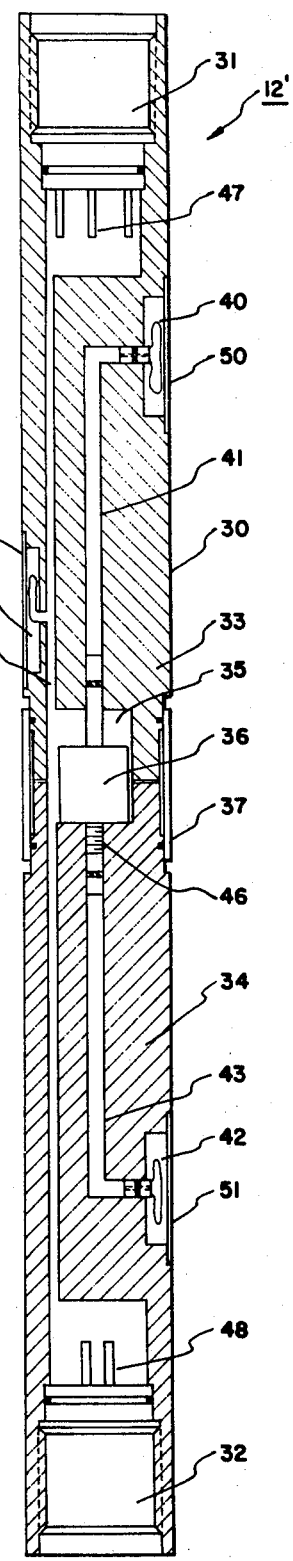
FIG. 3 is an elevational view in cross section showing a portion of the borehole instrument in accordance with the present invention.

Referring now to FIG. 3, there is illustrated in cross section a portion of the borehole instrument 12, that portion shown in FIG. 3 being generally identified by the numeral 12'. Subassembly 12' includes an elongated mandrel 30 having pressure blocks 31 and 32 at its opposite ends, each having pressure terminals in them to enable the wires to go to a dry chamber. The mandrel 30 includes an upper section 33 and a lower section 34 which when placed together form an inner chamber 35 in which a differential pressure transducer 36 is threadedly mounted, the threaded connection 46 having a fluid passage therethrough to establish fluid communication between the conduit 43 and transducer 36. A spin nut 37 connects the upper and lower housings 33 and 34, thus allowing them to be disassembled for ease of maintaining the transducer 36. The upper housing 33 includes a bellows assembly 40 which is connected to the transducer 36 by a conduit 41. The lower assembly 34 includes a second bellows 42 which is connected to the differential pressure transducer 36 by way of conduit 43. The conduits 41 and 43 are filled with a clean oil, for example, silicone oil. It should be appreciated that the bellows 40 and 42 are equally spaced by means of the conduits 41 and 43, respectively, from the differential pressure transducer 36 to provide an equal temperature expansion of the fluid in the conduits and thereby provide a true reading on the differential transducer 36.

The transducer 36 has wires (not illustrated) connected to either the terminals 47 or 48 by means of the fluid-filled conduit 45. The upper housing 33 also includes a third bellows 44 which is connected by means of a fluid-filled conduit 45, for example, filled with silicone oil, to the chamber 35 surrounding the differential pressure transducer 36.

The bellows assembly 40, bellows assembly 42 and bellows assembly 44 are respectively covered by slotted plates 50, 51 and 52 whereby the borehole fluid can pass through the slots within the slot plates and directly engage the individual bellows.

In the operation of the apparatus in accordance with the present invention, it should be appreciated that the borehole instrument 12 is caused to traverse the borehole by means of raising or lowering the cable 13. As is best illustrated in FIG. 1, the instrument 12 will from time to time engage a fluid interface, for example, as shown by the fluid interface 23.

Referring now to FIG. 3, it should be appreciated that the bellows 40, 42 and 44 are each exposed to whatever is in the borehole, be it oil, water, gas, or various combinations thereof. Since the bellows 44 is exposed to the borehole environment, the pressure within the fluid-filled chamber 35 will approximate the pressures within the transducer 36 and there will be no pressure buildup within the interior of the differential pressure transducer 36. Likewise, since the bellows 40 and 42 are equally spaced from the transducer 36, there will be no uneven temperature expansion which would otherwise result in an erroneous reading on the transducer 36. As the instrument comes to a fluid interface, the two measuring bellows 40 and 42 sense the pressure differential by means of the pressure transducer 36, and the resulting signal is sent up the cable 13 and recorded on the surface recorder by means well known in the art, for example, by the use of a simple voltage divider.

Thus, it should be appreciated that there have been illustrated and described herein the preferred embodiments of a simple but efficient apparatus for locating fluid interfaces within an earth borehole having widely varying pressure and temperature extremes. However, obvious modifications of the preferred embodiment will be apparent to those skilled in the art from a reading of the foregoing detailed specification. For example, although the preferred embodiment contemplates the use of a third bellows to pressure balance the differential pressure transducer, those skilled in the art will recognize that one or more of the conduits leading from the two measuring bellows can be tapped to the chamber 35 to provide pressure equalization.

The embodiments of the invention in which an exclusive property or privilege is claimed are defined as follows:

1. An apparatus for measuring a fluid interface in an earth borehole, comprising:
    an elongated instrument adapted to traverse an earth borehole;
    a fluid-filled chamber within said instrument;
    differential pressure transducer means located within said chamber, said transducer means having a housing and a transducer located within the interior of said housing and having two connections between the exterior of said housing and said transducer;
    first and second bellows located on the exterior of said instrument and spaced apart from each other along the length of said instrument;
    first and second fluid-filled conduits respectively connected between said first and second bellows and said first and second connections to said transducer; and
    means for adjusting the pressure of the fluid within said chamber.

2. The apparatus according to claim 1 wherein the volumetric interior of the first conduit is substantially equal to the volumetric interior of the second conduit, thereby providing substantially equal temperature expansion of the fluids therein.

3. The apparatus according to claim 2 wherein said first and second bellows are equally spaced from said transducer.

4. The apparatus according to claim 1 wherein said means for adjusting the pressure of the chamber fluid comprises a third bellows on the exterior of the instrument and a third fluid-filled conduit connected between said third bellows and said chamber.

5. The apparatus according to claim 1 wherein said means for adjusting the pressure of the chamber fluid comprises means for substantially matching the pressure of the chamber fluid to the pressure of the borehole fluid around at least a portion of said instrument.

* * * * *